(12) United States Patent
Yaginuma (10) Patent No.: US 10,976,331 B2
(45) Date of Patent: Apr. 13, 2021

(54) CONTAINER CONTAINING UNIT AND AUTOMATIC ANALYSIS APPARATUS

(71) Applicant: JEOL Ltd., Tokyo (JP)

(72) Inventor: Takashi Yaginuma, Tokyo (JP)

(73) Assignee: JEOL Ltd., Tokyo (JP)

( * ) Notice: Subject to any disclaimer, the term of this patent is extended or adjusted under 35 U.S.C. 154(b) by 300 days.

(21) Appl. No.: 15/951,487

(22) Filed: Apr. 12, 2018

(65) Prior Publication Data

US 2018/0313860 A1 Nov. 1, 2018

(30) Foreign Application Priority Data

Apr. 27, 2017 (JP) .............................. JP2017-087813

(51) Int. Cl.
*G01N 35/02* (2006.01)
*G01N 35/10* (2006.01)
*G01N 35/00* (2006.01)
*G01N 35/04* (2006.01)

(52) U.S. Cl.
CPC ....... *G01N 35/025* (2013.01); *G01N 35/1002* (2013.01); *B01L 2300/046* (2013.01); *G01N 2035/00277* (2013.01); *G01N 2035/00306* (2013.01); *G01N 2035/00356* (2013.01); *G01N 2035/00455* (2013.01); *G01N 2035/00534* (2013.01); *G01N 2035/0443* (2013.01)

(58) Field of Classification Search
CPC ............. G01N 35/025; G01N 35/1002; G01N 2035/00277; G01N 2035/00287; G01N 2035/00306; G01N 2035/00435; G01N 2035/00455; G01N 2035/0441; G01N 2035/0443; G01N 2035/0444; G01N 2035/0439; G01N 2035/0453; B01L 2300/04; B01L 2300/046; B01L 2400/0406; B01L 2300/041
USPC ......... 422/64, 412, 417, 547, 554, 562, 565, 422/570
See application file for complete search history.

(56) References Cited

FOREIGN PATENT DOCUMENTS

| JP | 2010060441 A | * | 3/2010 |
| JP | 2010230560 A | * | 10/2010 |
| JP | 2010230560 A | | 10/2010 |
| JP | 2010276555 A | * | 12/2010 |

* cited by examiner

*Primary Examiner* — Benjamin R Whatley
*Assistant Examiner* — Austin Q Le
(74) *Attorney, Agent, or Firm* — The Webb Law Firm (57) ABSTRACT

A container containing unit includes a housing and a lid member. The lid member has a probe insertion hole and a droplet guide portion. The droplet guide portion is formed at an edge of an opening end of the probe insertion hole and has a plurality of groove portions. The plurality of groove portions extend from the edge of the opening end to an outside of a locus through which the mouth of the container is moved.

5 Claims, 8 Drawing Sheets

CONTAINER CONTAINING UNIT AND AUTOMATIC ANALYSIS APPARATUS

CROSS-REFERENCE TO RELATED APPLICATION

This application claims priority to Japanese Patent Application No. 2017-087813 filed Apr. 27, 2017, the disclosure of which is hereby incorporated in its entirety by reference.

BACKGROUND OF THE INVENTION

Field of the Invention

The present invention relates to a container containing unit that contains a container while thermally insulating the container and an automatic analysis apparatus including this container containing unit.

Description of Related Art

An automatic analysis apparatus is used for testing in various fields such as immunity testing, biochemical testing, and blood transfusion testing. The automatic analysis apparatus performs analytical processes on many samples in parallel, and further, analyzes many components with high accuracy. Also, the automatic analysis apparatus includes a container containing unit that contains a container containing a reagent, a sample, and so forth used for the testing.

The container containing unit thermally insulates the container so as to prevent degradation of the reagent and the sample. Since the container is thermally insulated, condensation may occur in the container containing unit. Condensation is caused by a difference in temperature between the container containing unit and the outside air temperature and frequently occurs on a wall surface of the container containing unit in contact with the outside air.

Furthermore, a probe insertion hole is provided in a lid member of the container containing unit. The probe insertion hole allows a probe such as a reagent pipet or a dilution pipet to be inserted therein. The condensation is, in particular, likely to occur in this probe insertion hole. A droplet generated due to the condensation moves along the wall surface of the probe insertion hole and drops into the container containing unit. In the case where a mouth of the container exists at a point toward which the droplet drops, there is a problem in that the reagent or the sample is polluted with the droplet having entered the container.

Accordingly, Japanese Unexamined Patent Application Publication No. 2010-230560 describes a technique in which a lid has a through hole having a taper shape. The thermally insulated container is supported in a container containing unit such that the container is rotatable by a turntable in the circumferential direction.

SUMMARY OF THE INVENTION

Figure 8:
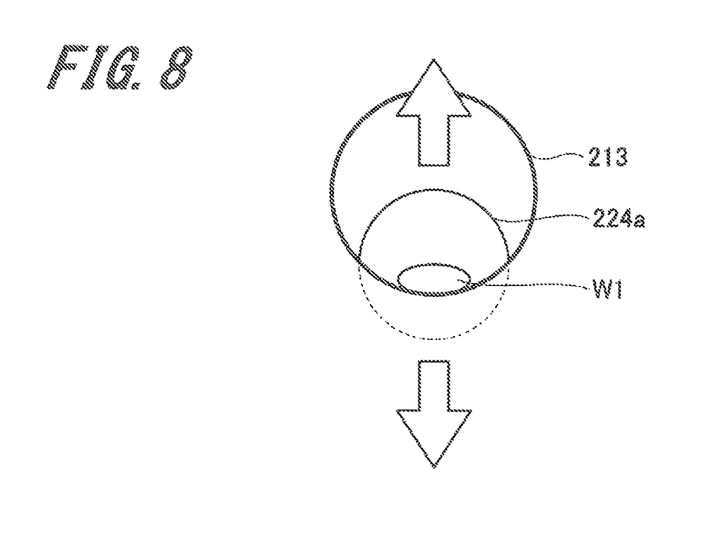
FIG. 8 is a schematic view illustrating the positional relationship between a probe insertion hole of a container containing unit and a mouth of a container of related art.

FIG. 8 is a schematic view illustrating the positional relationship between a container containing unit and a mouth of a container of related art. As illustrated in FIG. 8, a mouth 224a of the container and the edge of an opening of a probe insertion hole 213 are superposed on each other in the up-down direction when the container is moved. As a result, even with the technique described in Japanese Unexamined Patent Application Publication No. 2010-230560, a droplet may drop onto the mouth of the container when the mouth of the container and the edge of the through hole having a taper shape are superposed on each other.

In view of the above-described problem, an object of the present invention is to provide a container containing unit and an automatic analysis apparatus with which a droplet generated on a wall surface of a probe insertion hole can be prevented from dropping into a container contained in the container containing unit or the automatic analysis apparatus.

In order to address the above-described problem and achieve the object of the present invention, a container containing unit according to the present invention includes a housing and a lid member. The housing has an opening and is configured to contain and support a container having a mouth such that the container is movable. The lid member is configured to close the opening of the housing. Furthermore, the lid member has a probe insertion hole and a droplet guide portion. A probe configured to be inserted into and removed from the mouth of the container contained in the housing is to be inserted into the probe insertion hole. The droplet guide portion is formed at an edge of an opening end of the probe insertion hole facing the container and has a plurality of groove portions. The plurality of groove portions extend from the edge of the opening end to an outside of a locus through which the mouth of the container is moved.

Furthermore, an automatic analysis apparatus according to the present invention includes a container containing unit configure to contain a container having a mouth; and a probe configured to be inserted into and removed from the mouth of the container contained in the container containing unit. The above-described container containing unit is used as the container containing unit of this automatic analysis apparatus.

With the container containing unit and the automatic analysis apparatus according to the present invention, a droplet generated on the wall surface of the probe insertion hole can be prevented from dropping into the container contained in the container containing unit or the automatic analysis apparatus.

DESCRIPTION OF THE INVENTION

An example of an embodiment of an automatic analysis apparatus and a container containing unit according to the present invention will be described below with reference to FIGS. 1 to 7. The same members are represented by the same reference signs throughout the drawings.

1. The Example of the Embodiment 1-1. Structure of an Automatic Analysis Apparatus First, an automatic analysis apparatus according to the example of the embodiment of the present invention (referred to as "present example" hereafter) is described with reference to FIG. 1.

Figure 1:
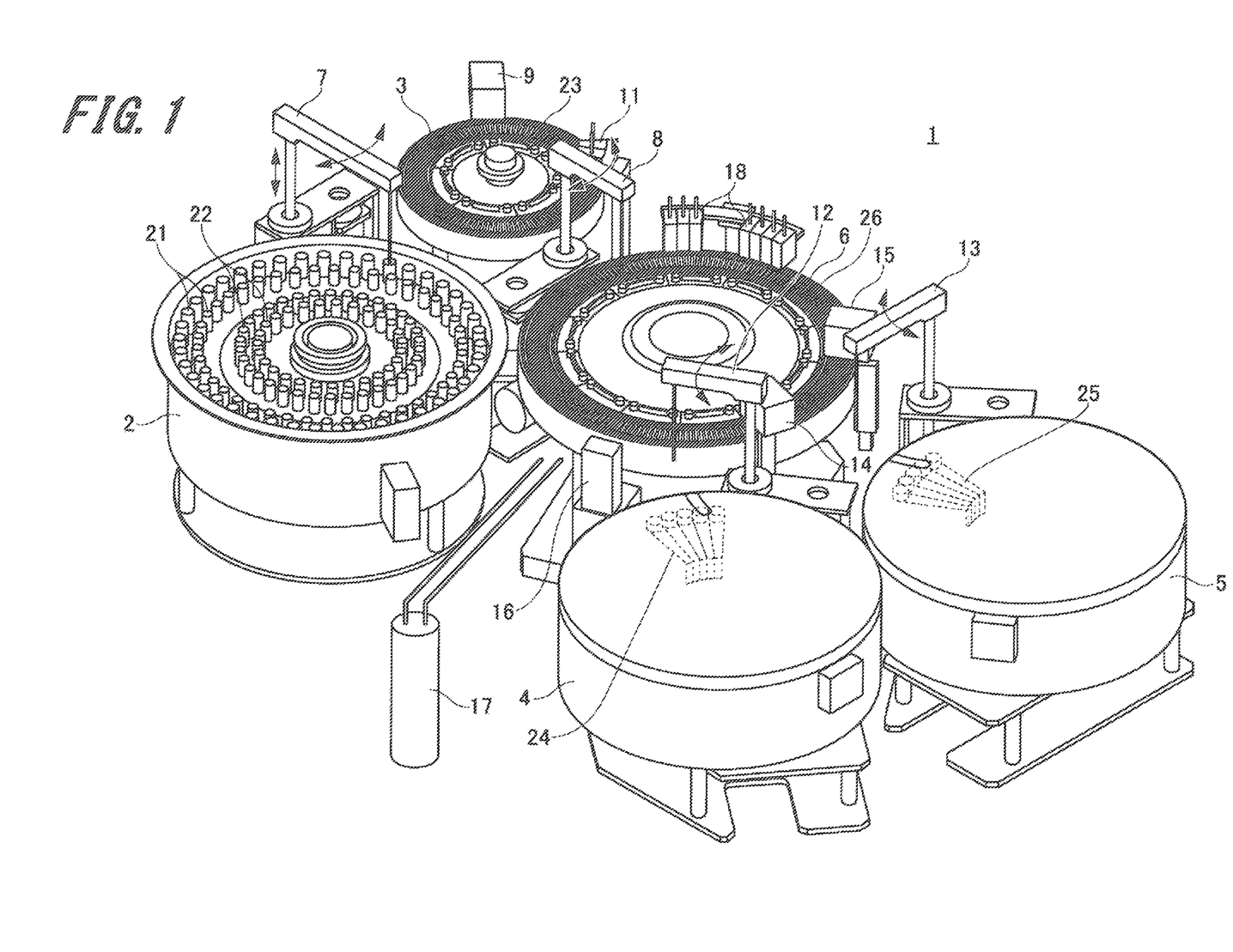
FIG. 1 schematically illustrates an automatic analysis apparatus according to an example of an embodiment of the present invention.

FIG. 1 schematically illustrates the automatic analysis apparatus according to the present example.

An apparatus illustrated in FIG. 1 is a biochemical analysis apparatus 1 used as an example of the automatic analysis apparatus according to the present invention. The biochemical analysis apparatus 1 automatically measures the quantities of particular components contained in biological samples such as blood and urine.

The biochemical analysis apparatus 1 includes a sample turntable 2, a dilution turntable 3, a first-reagent-container containing unit 4, a second-reagent-container containing unit 5, and a reaction turntable 6. The biochemical analysis apparatus 1 also includes a sample dilution pipet 7, a sampling pipet 8, a dilution agitating device 9, a dilution cleaning device 11, a first reagent pipet 12, a second reagent pipet 13, a first reaction agitating device 14, a second reaction agitating device 15, a multiple-wavelength photometer 16, and a reaction container cleaning device 18.

The sample turntable 2 has a substantially cylindrical container shape that is open at one end in the axial direction. The sample turntable 2 contains a plurality of sample containers and a plurality of diluent containers 22. A sample that includes, for example, blood or urine is contained in the sample containers 21. A special diluent is contained in the diluent containers 22. This special diluent is other than a physiological salt solution that is a normal diluent.

The plurality of sample containers 21 are spaced by a specified gap from one another in the circumferential direction of the sample turntable 2. Furthermore, two rows of the sample containers 21 arranged in the circumferential direction of the sample turntable 2 are set so as to be spaced from each other by a specified gap in the radial direction of the sample turntable 2.

The plurality of diluent containers 22 are disposed inside the rows of the plurality of sample containers 21 in the radial direction of the sample turntable 21. As is the case with the plurality of sample containers 21, the plurality of diluent containers 22 are spaced by a specified gap from one another in the circumferential direction of the sample turntable 2. Furthermore, two rows of the diluent containers 22 arranged in the circumferential direction of the sample turntable 2 are set so as to be spaced from each other by a specified gap in the radial direction of the sample turntable 2.

The plurality of sample containers 21 and the plurality of diluent containers 22 are not necessarily arranged in two rows and may be arranged in a single row or three or more rows in the radial direction of the sample turntable 2.

The sample turntable 2 is supported so as to be rotatable by a drive mechanism (not illustrated) in the circumferential direction. The drive mechanism (not illustrated) rotates the sample turntable 2 at a specified speed by a specified angle range at a time in the circumferential direction. The dilution turntable 3 is disposed near the sample turntable 2.

As is the case with the sample turntable 2, the dilution turntable 3 and the reaction turntable 6 each have a substantially cylindrical container shape that is open at one end in the axial direction. Drive mechanisms (not illustrated) rotate the dilution turntable 3 and the reaction turntable 6 at respective specified speeds by respective specified angle ranges at a time in the circumferential direction. The reaction turntable 6 is set to be rotated a half turn or larger in a single movement.

The dilution turntable 3 contains a plurality of dilution containers 23 arranged in the circumferential direction thereof. The sample having been sucked from the sample containers 21 disposed in the sample turntable 2 and diluted (referred to as "diluted sample" hereafter) is contained in the dilution containers 23.

The first-reagent-container containing unit 4 that represents an example of the container containing unit contains a plurality of first reagent containers 24 arranged in the circumferential direction thereof. Furthermore, the second-reagent-container containing unit 5 that represents the container containing unit contains a plurality of second reagent containers 25 arranged in the circumferential direction thereof. A condensed first reagent is contained in the first reagent containers 24 and a condensed second reagent is contained in the second reagent containers 25.

Furthermore, the first-reagent-container containing unit 4, the first reagent containers 24, the second-reagent-container containing unit 5, and the second reagent containers 25 are kept at a specified temperature by a thermal insulation mechanism 17. Thus, the first reagent contained in the first reagent containers 24 and the second reagent contained in the second reagent containers 25 are thermally insulated so as to be kept at specified temperatures.

The detailed structures of the first-reagent-container containing unit 4 and the second-reagent-container containing unit 5 will be described later.

The reaction turntable 6 is disposed between the dilution turntable 3 and the first-reagent-container containing unit 4 and the second-reagent-container containing unit 5. The reaction turntable 6 contains a plurality of reaction containers arranged in the circumferential direction thereof. The diluted sample sampled from the dilution containers 23 of the dilution turntable 3, the first reagent sampled from the first reagent containers 24 of the first-reagent-container containing unit 4, and the second reagent sampled from the second reagent containers 25 of the second-reagent-container containing unit 5 are injected into the reaction containers 26. The diluted sample, the first reagent, and the second reagent are agitated so as to react with one another in the reaction containers 26.

The sample dilution pipet 7 is disposed at a position near the sample turntable 2 and the dilution turntable 3. The sample dilution pipet 7 is supported such that the sample dilution pipet 7 is movable by a dilution pipet drive mechanism (not illustrated) in the axial direction (for example, the up-down direction) of the sample turntable 2 and the dilution turntable 3. Also, the sample dilution pipet 7 is supported such that the sample dilution pipet 7 is rotatable by the dilution pipet drive mechanism in the horizontal direction that is substantially parallel to the opening of the sample turntable and the opening of the dilution turntable 3. The sample dilution pipet 7, which is rotated in the horizontal direction, reciprocates between the sample turntable 2 and the dilution turntable 3. The sample dilution pipet 7 passes through a cleaning device in a non-illustrated manner during its movement between the sample turntable 2 and the dilution turntable 3.

Here, operation of the sample dilution pipet 7 is described.

The sample dilution pipet 7 having been moved to a specified position above the opening of the sample turntable 2 is moved downward in the axial direction of the sample turntable 2, and a pipet provided at a distal end of the sample dilution pipet 7 is inserted into one of the sample containers 21. At this time, a sampling pump (not illustrated) is operated. Thus, the sample dilution pipet 7 sucks a specified amount of the sample in the sample container 21. Next, the sample dilution pipet 7 is moved upward in the axial direction of the sample turntable 2, thereby removing the pipet from the sample container 21. Then, the sample dilution pipet 7 is rotated in the horizontal direction and moved to a specified position above the opening of the dilution turntable 3.

Next, the sample dilution pipet 7 is moved downward in the axial direction of the dilution turntable 3 so as to insert the pipet into specified one of the dilution containers 23. Then, the sample dilution pipet 7 discharges into the dilution container 23 the sucked sample together with a specified amount of diluent (for example, a physiological salt solution) supplied by the sample dilution pipet 7 itself. As a result, the sample is diluted to a concentration of a specified multiple in the dilution container 23. After that, the sample dilution pipet 7 is cleaned by the cleaning device.

The sampling pipet 8 is disposed between the dilution turntable 3 and the reaction turntable 6. As is the case with the sample dilution pipet 7, the sampling pipet 8 is supported such that the sampling pipet 8 is movable and rotatable by a sampling pipet drive mechanism (not illustrated) in the axial direction (up-down direction) and the horizontal direction of the dilution turntable 3. The sampling pipet 8 reciprocates between the dilution turntable 3 and the reaction turntable 6.

This sampling pipet 8 inserts a pipet into one of the dilution containers 23 of the dilution turntable 3 so as to suck a specified amount of the diluted sample. Then, the sampling pipet 8 discharges the sucked diluted sample into one of the reaction containers 26 of the reaction turntable 6.

The first reagent pipet 12 is disposed between the reaction turntable 6 and the first-reagent-container containing unit 4, and the second reagent pipet 13 is disposed between the reaction turntable 6 and the second-reagent-container containing unit 5. The first reagent pipet 12 is supported such that the first reagent pipet 12 is movable and rotatable by a first-reagent-pipet drive mechanism (not illustrated) in the axial direction (up-down direction) and the horizontal direction of the dilution turntable 6. The first reagent pipet 12 reciprocates between the first-reagent-container containing unit 4 and the reaction turntable 6.

The first reagent pipet 12 inserts a pipet into one of the first reagent containers 24 of the first-reagent-container containing unit 4 so as to suck a specified amount of the first reagent. Then, the first reagent pipet 12 discharges the first reagent having been sucked therein into one of the reaction containers 26 of the reaction turntable 6.

Furthermore, as is the case with the first reagent pipet 12, the second reagent pipet 13 is supported such that the second reagent pipet 13 is movable and rotatable by a second reagent pipet drive mechanism (not illustrated) in the axial direction (up-down direction) and the horizontal direction of the dilution turntable 6. The second reagent pipet 13 reciprocates between the second-reagent-container containing unit 5 and the reaction turntable 6.

The second reagent pipet 13 inserts a pipet into one of the second reagent containers 25 of the second-reagent-container containing unit 5 so as to suck a specified amount of the second reagent. Then, the second reagent pipet 13 discharges the second reagent having been sucked therein into one of the reaction containers 26 of the reaction turntable 6.

The dilution agitating device 9 and the dilution cleaning device 11 are disposed around the dilution turntable 3. The dilution agitating device 9 inserts an agitating element (not illustrated) into one of the dilution containers 23 so as to agitate the sample and the diluent.

The dilution cleaning device 11 cleans the dilution containers 23 after the diluted agent has been sucked from the dilution containers 23 by the sampling pipet 8. This dilution cleaning device 11 includes a plurality of dilution container cleaning nozzles. The plurality of dilution container cleaning nozzles are connected to a liquid discharge pump (not illustrated) and a detergent pump (not illustrated). The dilution cleaning device 11 inserts the dilution container cleaning nozzles into the dilution containers 23 and drives the liquid discharge pump, thereby sucking the diluted sample remaining in the dilution containers 23 through the dilution container cleaning nozzles. Then, the dilution cleaning device discharges the sucked diluted sample to a liquid discharge tank (not illustrated).

After that, the dilution cleaning device 11 supplies the detergent from the detergent pump to the dilution container cleaning nozzles and discharges the detergent into the dilution containers 23 from the dilution container cleaning nozzles. The insides of the dilution containers 23 are cleaned with this detergent. After that, the dilution cleaning device 11 sucks the detergent through the dilution container cleaning nozzles and dries the insides of the dilution containers 23.

The first reaction agitating device 14, the second reaction agitating device 15, and the reaction container cleaning device 18 are disposed around the reaction turntable 6. The first reaction agitating device 14 inserts an agitating element (not illustrated) into one of the reaction containers 26 so as to agitate the sample and the first reagent. Thus, a reaction between the diluted sample and the first reagent is uniformly and quickly performed. The structure of the first reaction agitating device 14 is the same as that of the dilution agitating device 9, and accordingly, description of the first reaction agitating device 14 is omitted here.

The second reaction agitating device 15 inserts an agitating element (not illustrated) into one of the reaction containers 26 so as to agitate the sample, the first reagent, and the second reagent. Thus, a reaction between the diluted sample, the first reagent, and the second reagent is uniformly and quickly performed. The structure of the second reaction agitating device 15 is the same as that of the dilution agitating device 9, and accordingly, description of the second reaction agitating device 15 is omitted here.

The reaction container cleaning device 18 cleans the insides of the reaction containers 26 when testing is completed. This reaction container cleaning device 18 includes a plurality of reaction container cleaning nozzles. As is the case with the dilution container cleaning nozzles, the plurality of reaction container cleaning nozzles are connected to a liquid discharge pump (not illustrated) and a detergent pump (not illustrated). Cleaning steps in the reaction container cleaning device 18 are similar to those of the dilution cleaning device 11 having been described above. Accordingly, description of the cleaning steps in the reaction container cleaning device 18 is omitted.

Furthermore, the multiple-wavelength photometer 16 is disposed near the reaction turntable 6 so as to face an outer wall of the reaction turntable 6. The multiple-wavelength photometer 16 performs optical measurement on the diluted sample having been injected into the reaction containers 26 and having reacted with the first reagent and the second reagent and outputs the amounts of various components in the sample as "absorbance", which is numeric data. In this way, a reacting state of the diluted sample is detected.

Furthermore, a thermostatic chamber (not illustrated) is disposed around the reaction turntable 6. This thermostatic chamber maintains the temperature of the reaction containers 26 provided in the reaction turntable 6 constantly at a fixed value.

1-2. Structure of the Container Containing Units

Next, the detailed structures of the first-reagent-container containing unit 4 and the second-reagent-container containing unit 5, which represent examples of the container containing unit, are described with reference to FIGS. 2 to 7.

Since the structures of the first-reagent-container containing unit 4 and the second-reagent-container containing unit 5 are the same, here, the first-reagent-container containing unit 4 is described. Hereafter, the first-reagent-container containing unit 4 is simply referred to as "container containing unit 4".

Figure 2:
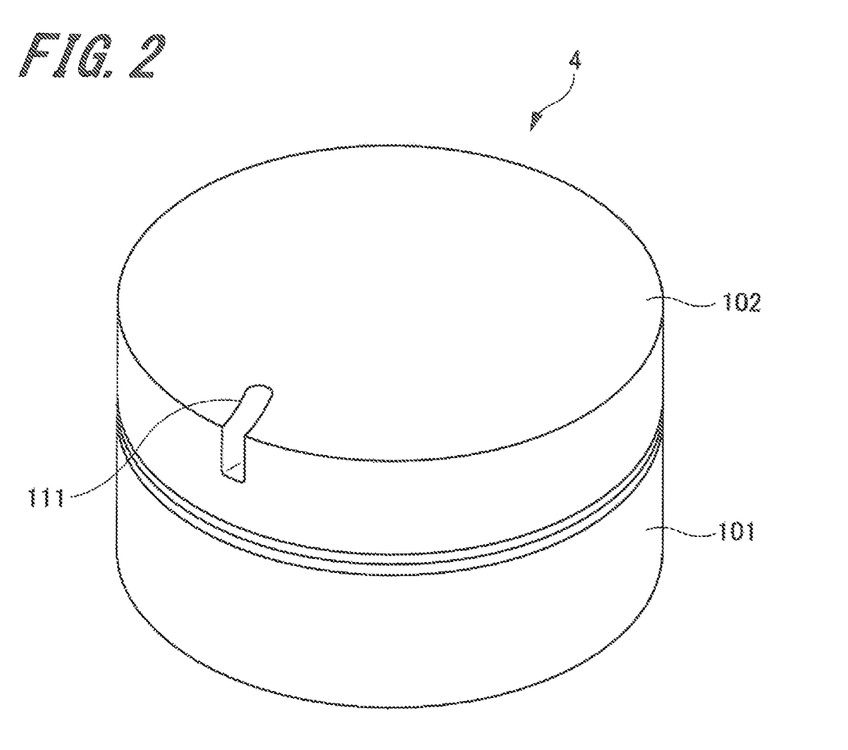
FIG. 2 is a perspective view of a container containing unit according to the example of the embodiment of the present invention.
Figure 3:
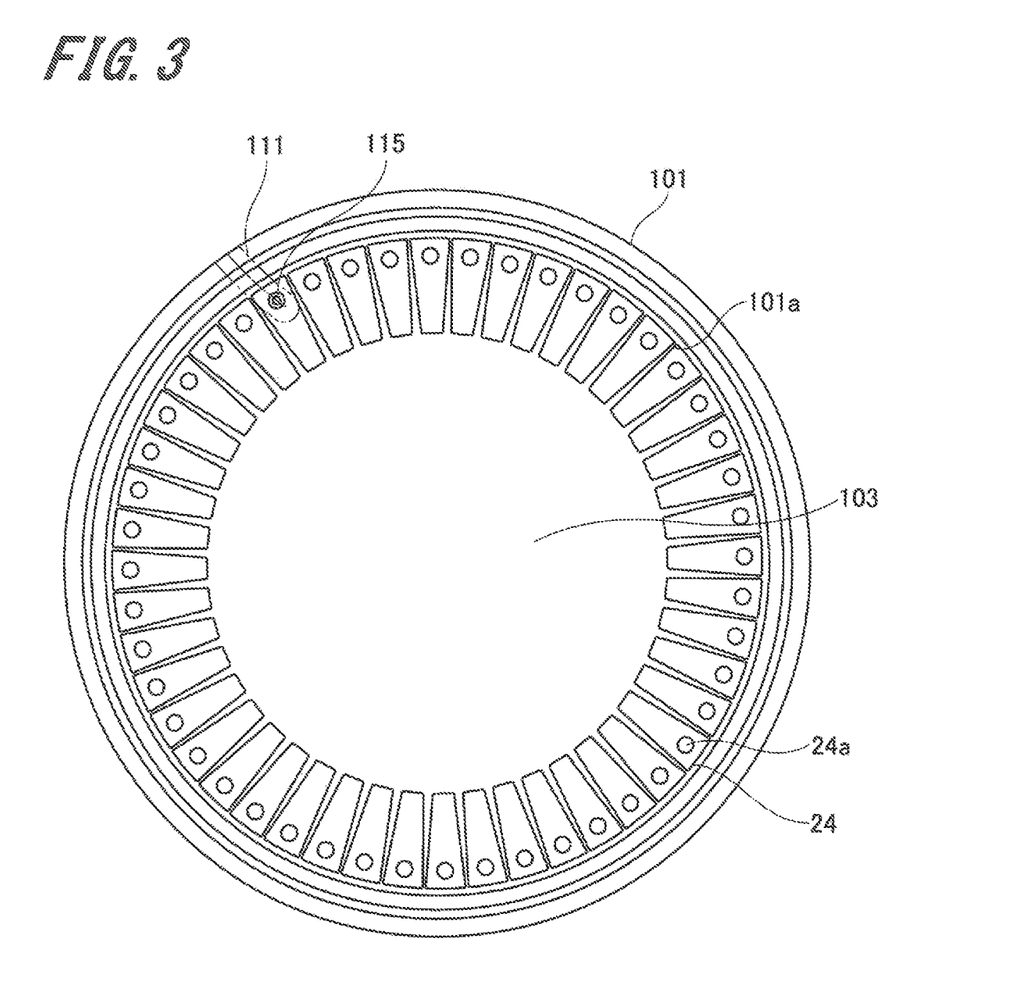
FIG. 3 is a plan view of a housing of the container containing unit according to the example of the embodiment of the present invention.
Figure 4:
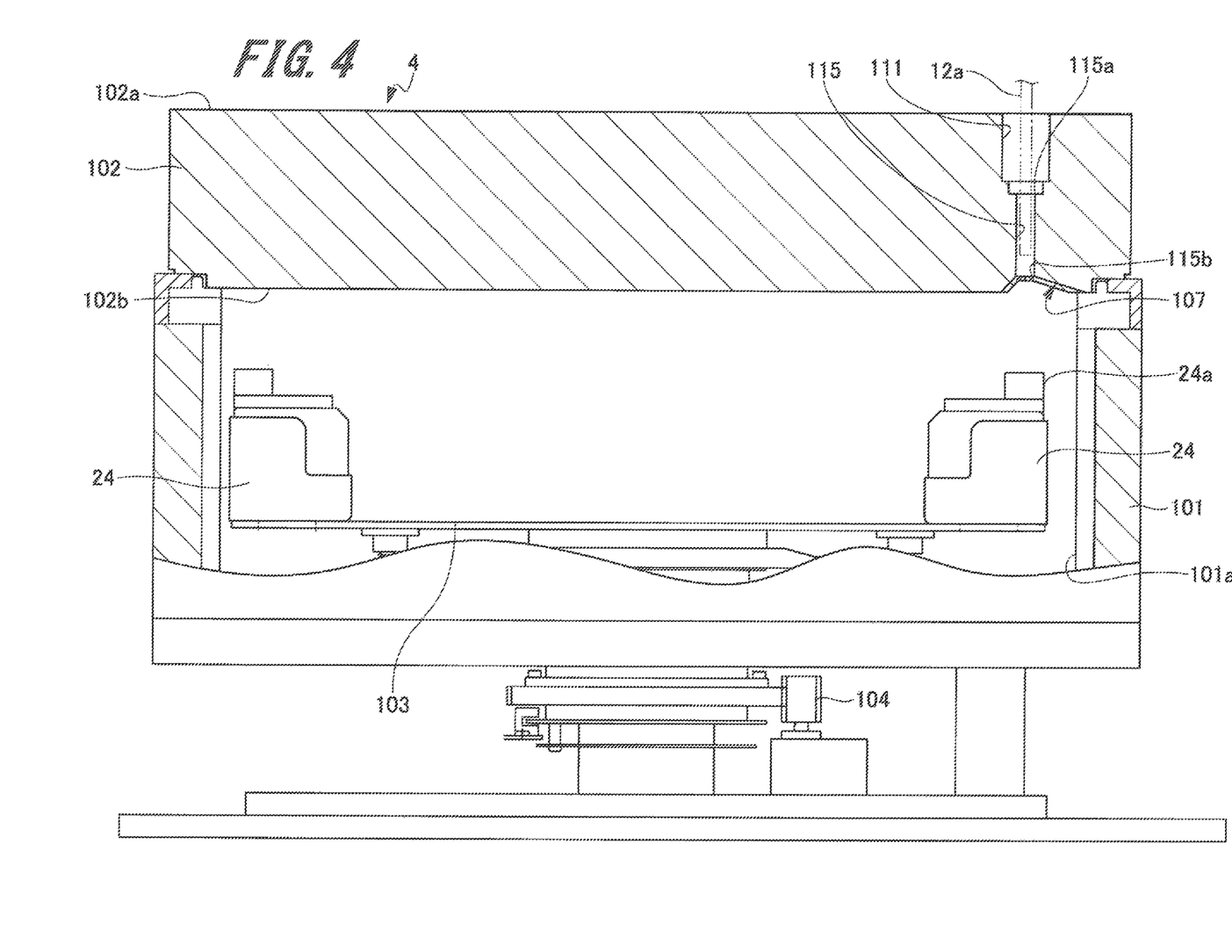
FIG. 4 is a sectional view of the container containing unit according to the example of the embodiment of the present invention.

FIG. 2 is a perspective view of the container containing unit 4. FIG. 3 is a plan view of the container containing unit 4. FIG. 4 is a sectional view of the container containing unit 4.

As illustrated in FIG. 2, the container containing unit 4 includes, for example, a housing 101 having a substantially cylindrical container shape, a lid member 102 that closes an opening of the housing 101, a turntable 103 (see FIG. 4) disposed in the housing 101, and a table drive mechanism 104 (see FIG. 4).

As illustrated in FIGS. 3 and 4, the turntable 103 is contained in an inner space 101a of the housing 101. The first reagent containers 24 are placed on the turntable 103. The first reagent containers 24 are arranged in the circumferential direction of the turntable 103.

The first reagent containers 24 each have a mouth 24a into which a probe 12a of the first reagent pipet 12 is to be inserted. The first reagent container 24 is disposed on the turntable 103 with the mouth 24a facing the opening of the housing 101. The housing 101 thermally insulates the first reagent containers 24 contained in the inner space 101a so as to keep the first reagent containers 24 at a specified temperature.

The turntable 103 is supported so as to be rotatable by the table drive mechanism 104 in the circumferential direction. The table drive mechanism 104 rotates the turntable 103 in a forward or reverse direction at a specified speed by a specified angle range at a time in the circumferential direction.

As illustrated in FIGS. 2 and 4, the lid member 102 has a columnar shape. The lid member 102 is formed of a heat insulating material. The lid member 102 has an upper surface portion 102a having a substantially circular shape and a lower surface portion 102b that faces the upper surface portion 102a and closes the opening of the housing 101. The lower surface portion 102b faces the first reagent containers 24 contained in the housing 101.

The lid member 102 has a passage recess 111 through which the probe 12a of the first reagent pipet 12 that sucks the reagent passes. The passage recess 111 is formed by cutting part of the upper surface portion 102a of the lid member 102 in an arc shape.

The passage recess 111 has a probe insertion hole 115 into which the probe 12a is inserted. The probe insertion hole 115 has a first opening end 115a provided in a lower surface portion of the passage recess 111 and a second opening end 115b provided in the lower surface portion 102b of the lid member 102.

The first opening end 115a and the second opening end 115b communicate with each other, and the probe insertion hole 115 is formed in the lid member 102 in the up-down direction from the lower surface portion of the passage recess 111 to the lower surface portion 102b of the lid member 102. Furthermore, as illustrated in FIG. 3, the probe insertion hole 115 is provided at a position of the passage recess 111 facing the mouth 24a of one of the first reagent containers 24 contained in the housing 101.

Furthermore, as illustrated in FIG. 4, a droplet guide portion 107 is formed around the second opening end 115b of the probe insertion hole 115. The droplet guide portion 107 is an inclined surface portion having an opening diameter that increases downward in the up-down direction from the edge of the second opening end 115b.

Figure 5:
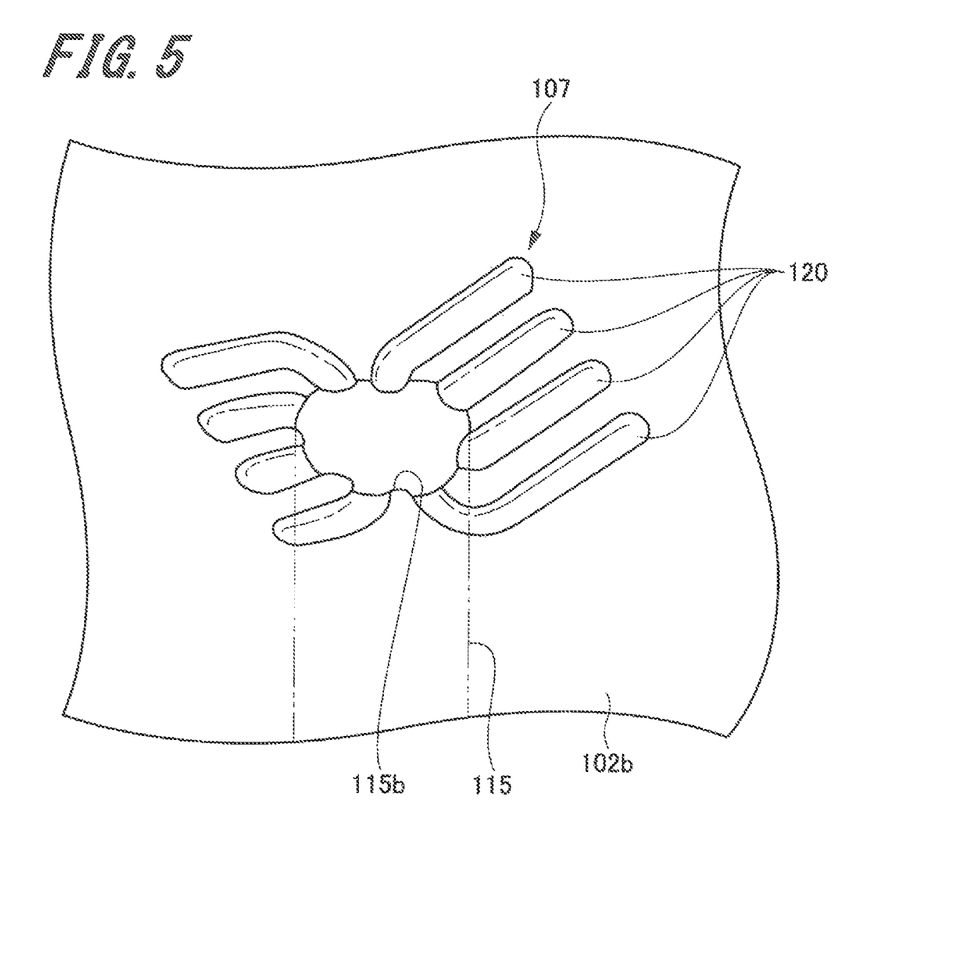
FIG. 5 is a perspective view of a droplet guide portion provided in a lid member of the container containing unit according to the example of the embodiment of the present invention when seen from a lower surface side.
Figure 6:
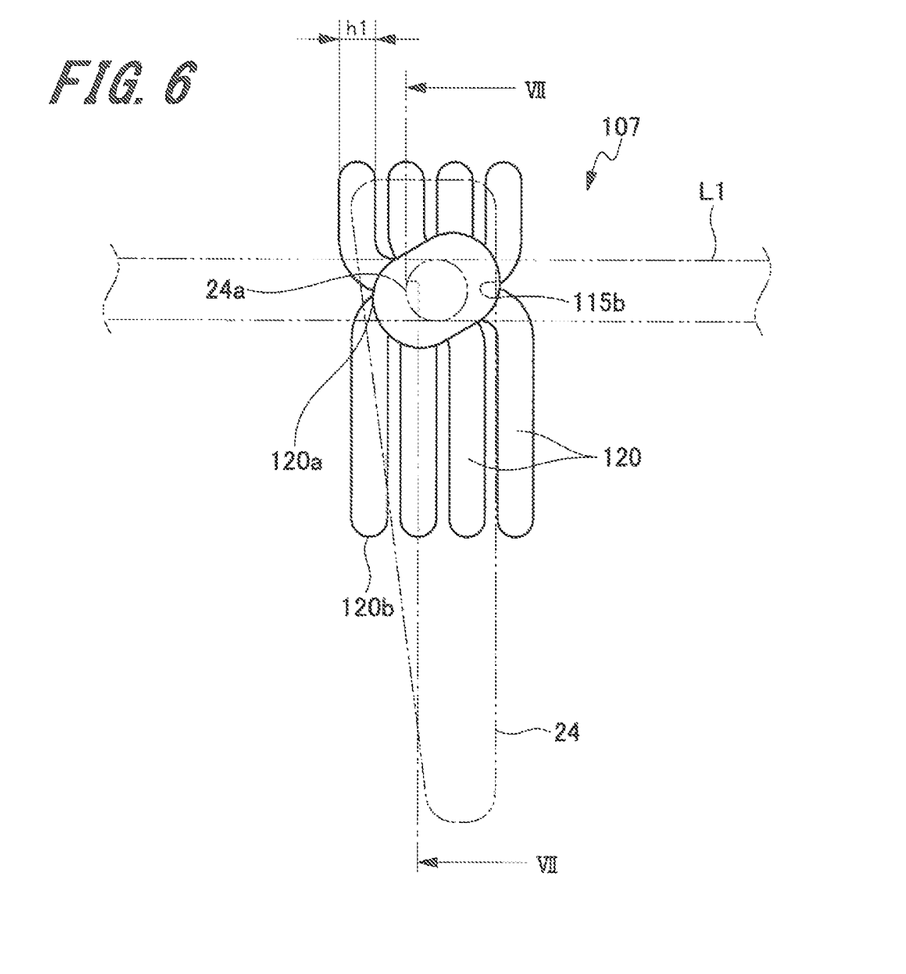
FIG. 6 is a plan view of the droplet guide portion of the container containing unit according to the example of the embodiment of the present example.
Figure 7:
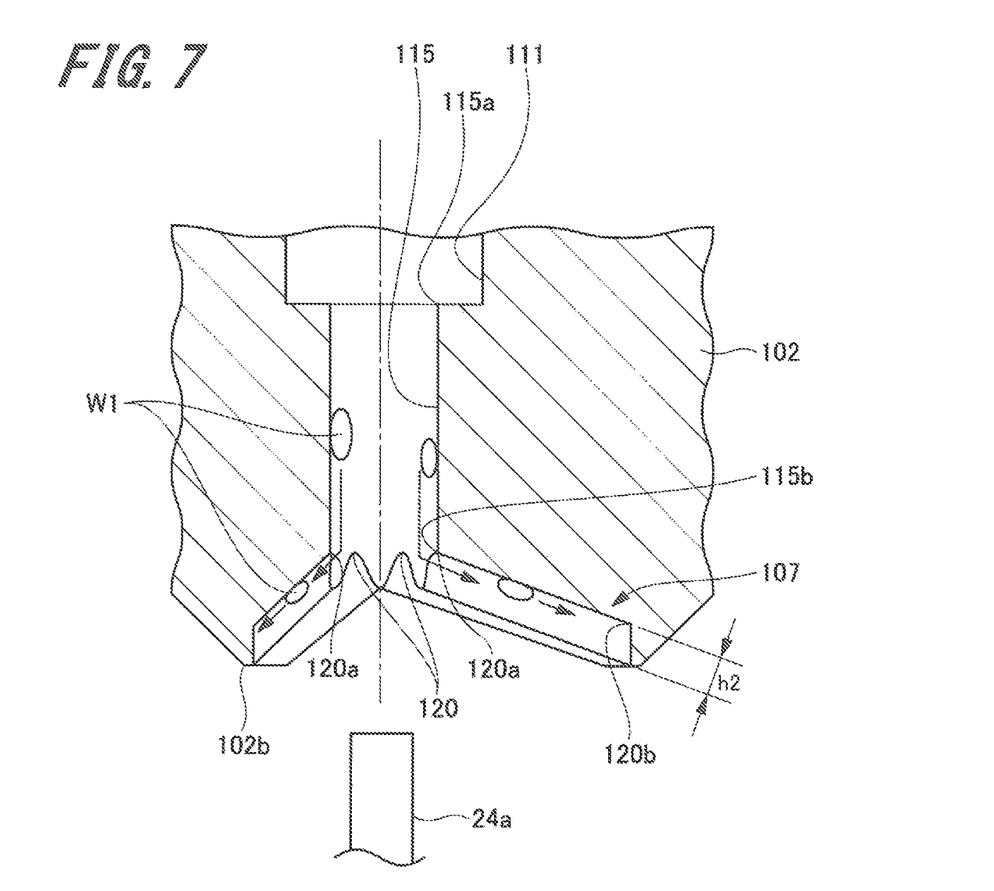
FIG. 7 is a sectional view taken along line VII-VII illustrated in FIG. 6.

FIG. 5 is a perspective view of the droplet guide portion 107 when seen from the lower surface portion 102b side. FIG. 6 is a plan view of the droplet guide portion 107. FIG. 7 is a sectional view taken along line VII-VII illustrated in FIG. 6.

As illustrated in FIG. 5, the droplet guide portion 107 has a plurality of groove portions 120. The plurality of groove portions 120 are formed such that the radially extending groove portions 120 are equally space from one another along the edge of the second opening end 115b of the probe insertion hole 115. The plurality of groove portions 120 are recesses recessed from the lower surface portion 102b toward the upper surface portion 102a in the lid member 102.

As illustrated in FIGS. 6 and 7, the groove portions 120 outwardly extend in the radial direction of the second opening end 115b from the edge of the second opening end 115b. One end 120a of each of the groove portions 120 is formed at the edge of the second opening end 115b. Furthermore, another end 120b of the groove portion 120 is formed outside a locus L1 through which the mouth 24a of each of the first reagent containers 24 passes on the lower side in the up-down direction. Thus, the groove portion 120 extends from the edge of the second opening end 115b to the outside of the locus L1.

The length of the groove portion 120 in a direction perpendicular to the extending direction, that is, the length of a width h1 (see FIG. 6) is set to, for example, about 1 to 2 mm. Furthermore, the length of the groove portion 120 upward from the lower surface portion 102b in the up-down direction, that is, a depth h2 is set to, for example, about 1 to 4 mm. The width h1 and the depth h2 of the groove portion 120 are set to such lengths that at least allows a capillary phenomenon to occur.

2. Operation of the Droplet Guide Portion 107

Next, operation of the droplet guide portion 107 of the container containing unit 4 having the above described structure is described.

As illustrated in FIG. 7, when a droplet W1 is generated on a wall surface of the probe insertion hole 115, this droplet W1 is moved downward along the wall surface of the probe insertion hole 115 in the up-down direction, that is, toward the second opening end 115b side due to gravity. The droplet W1 having been moved to the edge of the second opening end 115b enter one of the groove portions 120 of the droplet guide portion 107 due to a capillary phenomenon.

The droplet W1 is moved from the one end 120a to the other end 120b through the groove portion 120. As described above, the other end 120b of the groove portion 120 extends to the outside of the locus L1 through which the mouth 24a of the first reagent container 24 passes. Thus, the droplet W1 moving through the groove portion 120 is guided to the outside of the locus L1. Accordingly, even when the droplet W1 drops from the other end 120b of the groove portion 120, this droplet W1 does not enter the mouth 24a of the first reagent container 24. As a result, the droplet W1 generated on the wall surface of the probe insertion hole 115 can be prevented from entering the first reagent container 24 by a simple structure.

Furthermore, the size of the groove portion 120 is set to such a size that allows a capillary phenomenon to occur. Accordingly, the droplet W1 can be prevented from dropping while moving from the one end 120a to the other end 120b of the groove portion 120.

Furthermore, the plurality of groove portions 120 are equally spaced from one another along the edge of the second opening end 115b. Thus, the droplet W1 generated on the wall surface of the probe insertion hole 115 can be reliably guided to the other end 120b of one of the groove portions 120 without dropping from the edge of the second opening end 115b.

The present invention is not limited to the embodiment having been described above and illustrated in the drawings. A variety of modified embodiments are possible without departing from the gist of the invention described in the claims.

Although the groove portions 120 are recesses provided in the lower surface portion 102b in the above-described example of the embodiment, this is not limiting. For example, a plurality of ribs that project from the lower surface portion 102b toward the container to a specified height may be provided, and each of the groove portions may be formed between two adjacent ribs of the plurality of ribs. At this time, the ribs extend from the edge of the second opening end 115b to the outside of the locus L1 through which the mouth 24a passes.

For example, as the automatic analysis apparatus, the example is described in which the automatic analysis apparatus is used for the biochemical analysis apparatus used to analyze biological samples such as blood and urine. However, this is not limiting. The automatic analysis apparatus according to the present invention can be used for any of apparatuses for variety of other analyses such as an analysis of water quality and an analysis of food. Furthermore, as the automatic analysis apparatus, for example, an immunoanalyzer that analyzes immunity such as an antigen-antibody reaction of a test sample may be used.

Furthermore, although the reagent container containing units in which the reagent containers are contained are used as the container containing unit, this is not limiting. The container containing unit can be used for, for example, a sample container containing unit that contains a sample container in which a sample is contained, a dilution container containing unit that contains a dilution container in which a diluted sample is contained, a reaction container containing unit that contains a reaction container, and any of container containing units that contain other containers.

Although the terms such as "parallel" and "perpendicular" have been used herein, these terms refer to not only exactly "parallel" and exactly "perpendicular" but also refer to "parallel" and "perpendicular", and further, may refer to "substantially parallel" and "substantially perpendicular" within ranges in which functions can be achieved.

What is claimed is:

1. A container containing unit comprising:
   a housing that has an opening and that is configured to contain and support a container having a mouth such that the container is movable; and
   a lid member configured to close the opening of the housing,
   wherein the lid member has a probe insertion hole into which a probe configured to be inserted into and removed from the mouth of the container contained in the housing is to be inserted and a droplet guide portion which is formed at an edge of an opening end of the probe insertion hole facing the container and which has a plurality of groove portions, and
   wherein each groove portion of the plurality of groove portions comprises a groove beginning and a groove end wherein each groove portion of the plurality of groove portions extends from the groove beginning at the edge of the opening end to the groove end at an outside of a locus through which the mouth of the container is moved,
   wherein the groove beginnings of each groove portion of the plurality of groove portions are equally spaced from each other along the edge of the opening end, and the groove ends of each groove portion of the plurality of groove portions are separated from each other; and
   wherein at least one groove portion of the plurality of groove portions changes radial direction between the groove beginning of the at least one groove portion and the groove end of the at least one groove portion wherein a first radially straight section at the groove beginning of the at least one groove portion directed in a first radial direction is separated from a second radially straight section at the groove end directed in a second radial direction by a bend in the at least one groove portion such that the first radial direction and the second radial direction are in different directions.

2. The container containing unit according to claim 1, wherein a width and a height of the plurality of groove portions is set to a length that allows a capillary phenomenon to occur.

3. The container containing unit according to claim 1, wherein the plurality of groove portions are recessed from a lower surface portion of the lid member facing the container toward an upper surface portion on an opposite side to the lower surface portion.

4. The container containing unit according to claim 1, wherein a plurality of ribs are formed so as to project toward the container from a lower surface portion of the lid member facing the container, and the plurality of groove portions are each formed between two adjacent ribs of the plurality of ribs.

5. An automatic analysis apparatus comprising:
   a multiple wave-length photometer;
   a container containing unit configured to contain a container having a mouth; and
   a probe configured to be inserted into and removed from the mouth of the container contained in the container containing unit, wherein the container containing unit comprises
- a housing that has an opening and that is configured to contain and support the container such that the container is movable; and
- a lid member configured to close the opening of the housing, wherein the lid member has a probe insertion hole into which the probe is to be inserted and a droplet guide portion which is formed at an edge of an opening end of the probe insertion hole facing the container and which has a plurality of groove portions, and wherein each groove portion of the plurality of groove portions comprises a groove beginning and a groove end wherein each groove portion of the plurality of groove portions extends from the groove beginning at the edge of the opening end to the groove end at an outside of a locus through which the mouth of the container is moved, wherein the groove beginnings of each groove portion of the plurality of groove portions are equally spaced from each other along the edge of the opening end, and the groove ends of each groove portion of the plurality of groove portions are separated from each other; and wherein at least one groove portion of the plurality of groove portions changes radial direction between the groove beginning of the at least one groove portion and the groove end of the at least one groove portion wherein a first radially straight section at the groove beginning of the at least one groove portion directed in a first radial direction is separated from a second radially straight section at the groove end directed in a second radial direction by a bend in the at least one groove portion such that the first radial direction and the second radial direction are in different directions.

* * * * *